United States Patent
Mastie et al.

(10) Patent No.: US 7,626,715 B2
(45) Date of Patent: Dec. 1, 2009

(54) JOINED FRONT END AND BACK END DOCUMENT PROCESSING

(75) Inventors: Scott D. Mastie, Longmont, CO (US); Joan L. Mitchell, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 992 days.

(21) Appl. No.: 10/428,709

(22) Filed: May 2, 2003

(65) Prior Publication Data

US 2004/0218203 A1 Nov. 4, 2004

(51) Int. Cl.
*G06F 15/00* (2006.01)
*G06Q 30/00* (2006.01)

(52) U.S. Cl. .......................... 358/1.15; 705/26

(58) Field of Classification Search ................ 358/1.13, 358/448, 1.15, 1.18, 401, 3.01, 504, 524, 358/402, 521, 1.16; 235/375, 51, 386; 101/183, 101/211; 382/254, 159; 707/E17.008, 3, 707/5, 10; 705/2, 12, 16, 26, 38, 43, 67; 377/22, 37; 713/176

See application file for complete search history.

(56) References Cited

U.S. PATENT DOCUMENTS

| 6,266,150 | B1 | 7/2001 | Brossman et al. | |
| 2002/0145747 | A1* | 10/2002 | Burquist et al. | 358/1.14 |
| 2003/0033319 | A1* | 2/2003 | Van Der et al. | 707/102 |
| 2003/0160095 | A1* | 8/2003 | Segal | 235/375 |
| 2004/0068690 | A1* | 4/2004 | Wood | 715/500 |
| 2005/0196074 | A1* | 9/2005 | Deere | 382/305 |
| 2006/0004870 | A1* | 1/2006 | Pomeroy et al. | 707/104.1 |

* cited by examiner

*Primary Examiner*—Saeid Ebrahimi Dehkordy
(74) *Attorney, Agent, or Firm*—Blakely, Sokoloff, Taylor & Zafman LLP

(57) ABSTRACT

Systems, methods and program products for joining front-end processing with back-end processing of printed documents. In particular, the invention calls for collecting print data usable for printing a document (i.e., by persistently saving data used to print a document), imaging the document after use, and processing the document using the print data and image data together.

13 Claims, 2 Drawing Sheets

JOINED FRONT END AND BACK END DOCUMENT PROCESSING

BACKGROUND OF THE INVENTION

1. Technical Field

The present invention relates generally to document processing, and more particularly, to the joining of front-end and back-end document processing.

2. Related Art

Despite the evolution of electronic communications, the requirement of formalized documents as a communications medium remains in many industries. The content and layout of documents vary according to industry. For example, documents may include: correspondence, checks, orders, invoices, receipts, filled-out forms (e.g., insurance applications and completed tests), securities, etc. Processing of documents, however, has progressed such that many documents have a digital life in addition to a physical printed existence. In industries where a large number of documents are necessary, document processing management becomes very important. Document processing management can normally be broken into three stages: front-end generation of the document, usage of the document, and back-end processing of the used document. The content of each stage may vary according to industry.

During the front-end generation of documents, the document generation data exists as a variety of text (e.g., ASCII), graphics, and images, which is often extracted from multiple databases. The data can be organized in a variety of ways. In some cases, proprietary formats and systems may be used that are not publicly accessible. Where documents are printed, many printers accept text formats such as PostScript and create the print data on-the-fly with no storage of data. Alternatively, some printers create the print data and temporarily store it in one or more buffers. This data, however, is never used beyond the front-end generating stage. In other cases, some systems use a post-printer camera or quality check system that records the printed documents after printing by making another image of them. This data, however, is never used beyond the front-end generating stage.

Archival requirements for the printed documents may vary, for example, by industry. One illustrative industry in which document processing and archiving has a significant role is the banking and finance industry. In this industry, important data such as customer statements or check images are usually archived so that a record of what was generated exists. Archived documents in some form are often made available to customer support operations, so that customer support representatives can review what was sent to the customer, received from the customer or returned to the customer (e.g., a cancelled check). Archiving of these documents may include saving the text data, or the print-ready pages, or a combination (e.g., some print-ready pages with selected text data is common in repositories such as IBM's ContentManager, OnDemand). In contrast, the pixel data per page, i.e., the actual image of which pixels were used on the page, may not be saved even temporarily.

In order to facilitate processing and archival storage during back-end processing of the printed documents, i.e., after their intended use, many organizations image used documents that are received by scanning them. For example, in the insurance industry, some companies scan all received correspondence. The letters, application forms, reports, etc., are then handled as images for processing. The information printed on these documents is often converted to text data by optical character recognition (OCR) programs to make text searching and data mining feasible and to assist in indexing. When OCR is not used, labor intensive and time-consuming manual keying-in of the data may be implemented. In any event, significant time and effort is oftentimes expended indexing, reconciling, error checking, and fraud detecting as part of back-end processing of used documents.

One problem with conventional approaches to document processing management is that front-end generating data is not used with back-end processing data. This may be the case even when the front-end document generating data exists in the same organization as the back-end processing. More often, however, the problem exists because the front-end and back-end processes do not exist in the same organization. For example, in the banking and finance industry, checks can be issued by a large number of institutions and cashed by an equally large and independent number of institutions. For the clearing of checks, banking institutions often overnight express CD-ROMs of the check images to their large commercial customers. Some institutions manually compare the checks to their text data. In this case, unless the cashing bank happened to have written the check, it is highly unlikely to have access to the front-end processing data for detecting errors. There is no current service that prints checks and leverages the original data to ensure the accuracy of the checks cashed by comparing each cashed check to the check that was printed. As another example, insurance companies that receive and scan used documents oftentimes have documents generated by an outside third party such that the original information used to print the documents is not accessible. In the past there has been no way to link up the front-end generation of the documents with the back-end scanned versions at the receiver when these operations happen in different companies.

Another example industry in which separation of front-end generation and back-end processing creates problems is the testing industry. In this industry, test booklets are often printed in sections and assembled such that each test in a group has uniquely ordered questions. After use, the test booklets are split apart into sections again, scanned, and individually sent to scorers. This process is time consuming and tedious. In addition, paper test booklets are archived in warehouses for various amounts of time in case scoring is questioned. Finding a particular used test booklet in the warehouse is also time consuming and labor intensive. Currently, no way to link up the front-end generation of tests with the back-end scoring and archiving processes exists.

In view of the foregoing, there is a need in the art for joining front-end and back-end processing of documents.

SUMMARY OF THE INVENTION

The invention provides systems, methods and program products for joining front-end processing with back-end processing of documents. In particular, the invention calls for collecting print data usable to print a document (i.e., by persistently saving data usable to print a document), imaging the document after use, and processing the document using the print data and image data together.

A first aspect of the invention is directed to a method of processing a document, the method comprising the steps of: collecting print data usable for printing the document; imaging the document after use to create image data; and processing the document after use using the print data and the image data.

A second aspect of the invention is directed to a system for document processing, the system comprising: a front-end document generating system including: a printing system for generating print data usable for printing a document based on document generation data; and a data collector for persistently saving print data generated by the printing system.

A third aspect of the invention is directed to a system for document processing, the system comprising: a back-end document processing system for processing a document after use including a first access module configured to allow access to print data generated by a front-end document generating system that generated the print data based on document generation data.

A fourth aspect of the invention is directed to a computer program product comprising a computer useable medium having computer readable program code embodied therein, the program product comprising: program code configured to generate print data usable for printing a document based on document generation data; and program code configured to persistently save print data generated by the program code configured to generate print data.

A fifth aspect of the invention is directed to a computer program product comprising a computer useable medium having computer readable program code embodied therein for processing a document, the program product comprising: program code configured to generate image data from imaging of the document after use; program code configured to access print data generated by a front-end document generating system that generates print data usable for printing the document based on document generation data; and program code configured to process the document using the print data and the image data.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the following description includes the following headers: I. Document Processing Management Environment Overview; II. Front-end Document Generating System; III. Back-end Document Processing System; IV. Operation; V. Example Uses—Processing Applications; and VI. Conclusion.

I. DOCUMENT PROCESSING MANAGEMENT ENVIRONMENT OVERVIEW

Figure 1:
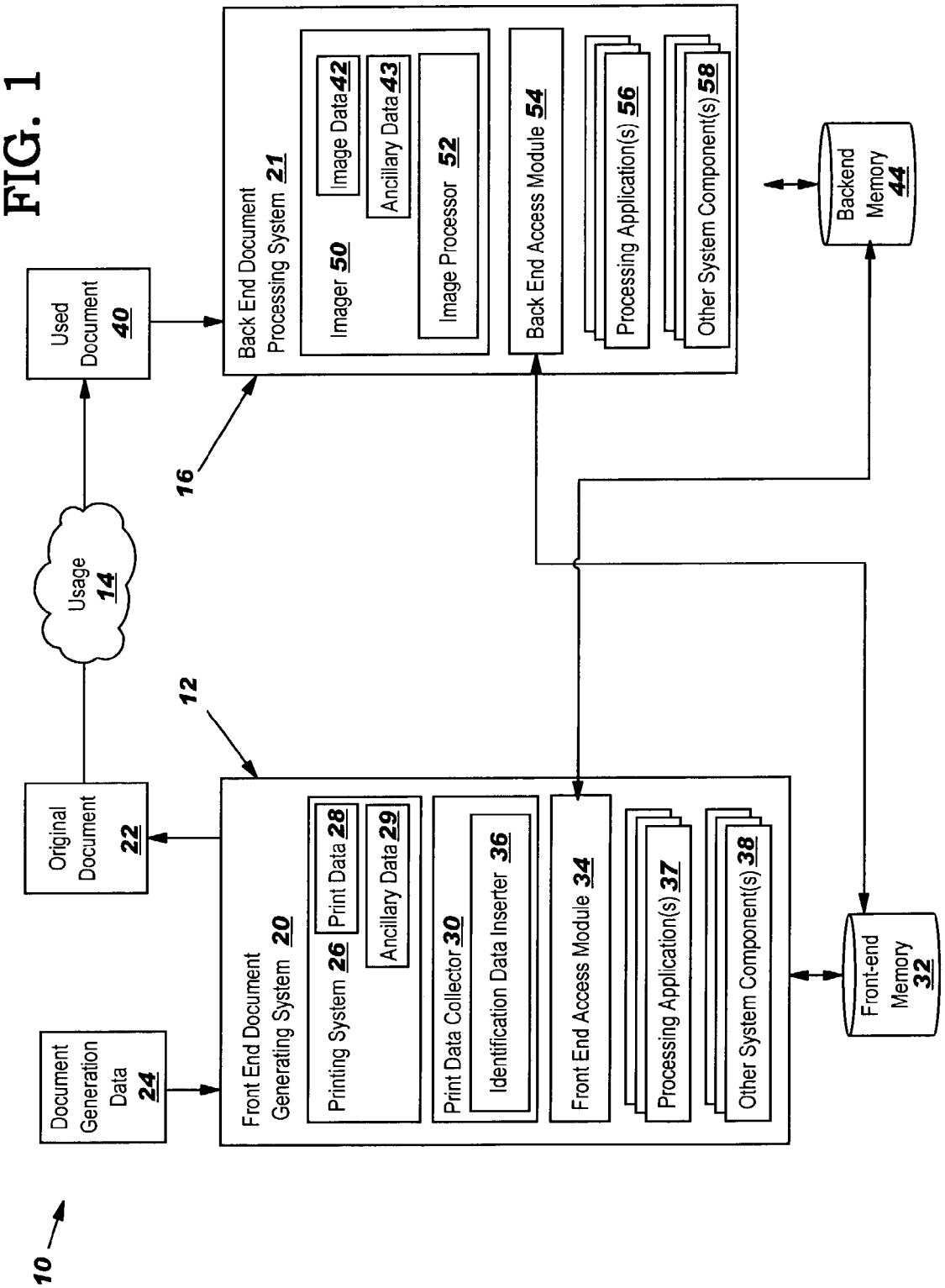
FIG. 1 shows a block diagram illustrating a document processing management environment according to the invention.

With reference to the accompanying drawings, FIG. 1 is a block diagram illustrating a document processing management environment 10 of the invention. Document processing management environment 10 generally includes three stages: the front-end generation of the document stage 12, usage of the document stage 14, and the back-end processing of the used document stage 16.

Referring to usage stage 14, the invention will be explained relative to a document used in the banking and finance industry such as a check. However, as explained below, the invention has applicability to a wide variety of industries and should not be limited to any particular industry. Usage stage 14 may include simple transfer of a document, or may include filling in blank spaces, marking up the document, adding signatures and/or stamps, and/or otherwise altering the document.

With continuing reference to FIG. 1, the general movement of a document in environment 10 includes generation of an original document 22 at front-end generation stage 12 by a front-end document generation system 20, usage of document 22 by a user at usage stage 14, and then processing at back-end processing stage 16 by a back-end document processing system 21. Each system 20, 21 will be described in greater detail below. As will become evident, the content of each stage varies depending on industry. As an overview, the invention captures electronically and saves print data 28 usable for printing a document, i.e., at stage 12, and then makes this data accessible for back-end processing stage 16. In this fashion, back-end processing can use the print data used to actually generate the original document, and image data that is obtained when the used document is scanned. In addition, back-end image data can be made available to front-end generating system 20.

II. FRONT-END DOCUMENT GENERATING SYSTEM

As noted above, at stage 12, a front-end document generation system 20 (hereinafter "generating system 20") is provided to generate an original document 22. It should be recognized that while one generating system 20 has been illustrated, that a number of generating systems 20 may exist within environment 10. For example, in the banking and finance industry, a number of check writing entities such as individuals, corporations, payroll management companies such as PayChex®, etc., exist. Generation of document 22 is based on document generation data 24. Document generation data 24 may exist as a variety of text data (e.g., ASCII), graphics, and base images that are combined to form document 22. In terms of a check, document generation data 24 may include, for example: text data such as a check amount, date, check issuer, payee, payer, etc.; graphics data such as a verifying watermark, check issuer logo, etc.; and base images such as a check background or other image. As known in the art, document generation data 24 may be extracted from multiple databases (not shown).

Generating system 20 includes a printing system 26, a print data collector 30, a front-end access module 34, processing application(s) 37 and other system component(s) 38. Printing system 26 includes any now known or later developed mechanisms for generating print data 28, which may be used for printing a document 22. Printing system 26 may include, for example, laser printers, impact printers, line printers, dot matrix printers, typewriters, ink jet printers, other printer types, or a combination thereof. In operation, printing system 26 takes document generation data 24 and organizes it in any of a number of now known or later developed methods to form the desired document 22. In doing so, printing system 26 generates print data 28. "Print data" is any data generated by printing system 26 usable for physically generating printed document 22 including data that is normally only stored temporarily or non-persistently, e.g., pixel data in a print buffer. That is, print data 28 includes print-ready data including at least one of image data, pixel data (aka pels) and language data that is transformed from document generation data 24 (raw data) by printing system 26. Thus, print data 28 may include both an image version and a coded text version of the content printed. Printing system 26 may include mechanisms to actually print document 22, or may include a processor(s) to generate print data 28 without actually printing the document. Accordingly, print data 28 does not necessarily need to be used to actually print a document.

Print data collector 30 (hereinafter "collector 30") is configured to capture and persistently save (i.e., for long-term) print data 28. Print data collector 30 may also save ancillary data 29 with print data 28. "Ancillary data," in the context of generating system 20, may include any industry specific data that is useful for back-end processing. In the banking and finance industry, ancillary data 29 may include, for example, account number, amount of check, indexing information, inserted identification data, original print data stream, text information, indexing information, scanned versions of impact printer fonts, ideal versions of impact printer fonts, a JBIG-2 (Joint Bilevel Image experts Group) compressed version of the original document, an electronic version of the original document, directions of where to send back-end version for archival storage, or any other data required by a particular industry. Print data 28 (and ancillary data 29) may be saved, for example, in a front-end memory 32. Memory 32 may comprise any now known or later developed data storage system and/or transmission media, including magnetic media, optical media, random access memory (RAM), read only memory (ROM), a data object, etc. Moreover, memory 32 may reside at a single physical location comprising one or more types of data storage, or be distributed across a plurality of physical systems. Print data 28 may be ordered in any fashion in memory 32 desired for easy indexing. For example, for checks ordering may be by date, check number, etc. Print data 28 in memory 32 may also be primary-key indexed by a unique combination of keyline data, so that every check's image data 42 can be uniquely paired up with its corresponding print data 28 for use by processing applications 37, 56, as will be described below.

Collector 30 may also include an identification data inserter 36 that is configured to insert identifying data (not shown) into print data 28. Identifying data may include, for example, a document user identification, an industry-specific document identifier, generating system identifier, suggested indexing for back-end image data, watermark, bar code, running header, running footer, secret symbols for authentication, etc. Relative to a generating system identifier, it should be recognized that while one generating system 20 has been illustrated, that a number of generating systems may exist within environment 10. For example, in the banking and finance industry, a number of check writing vendors such as PayChex® may exist. Each generating system may insert an identifier into their respective print data 28 that can be used later to identify a source generating system 20.

Front-end access module 34 includes any hardware and/or software configured to make print data 28 accessible to back-end document processing system 21. Front-end access module 34 may include, for example, a security login package for generating system 20 and/or front-end memory 32, an encryption key supplier so data is transmitted securely, sending third party destination information if the front-end and back-end processing is to be handled elsewhere, etc.

Other system component(s) 38 may provide any other functionality now known or later developed for document generating system 20 or ancillary services. One illustrative other system component 38 may be a digital compression package for print data 28.

It should be recognized that generating system 20 may take a variety of forms beyond a system that simply generates documents. For instance, generating system 20 may take the form of a point-of-sale terminal that prints receipts and stores print data 28 about the receipts.

III. BACK-END DOCUMENT PROCESSING SYSTEM

Back-end document processing system 21 (hereinafter "processing system 21") is designed to receive a used document 40 after usage stage 14, and conduct any of a variety of processing tasks on, or based on, used document 40. It should be recognized that while one processing system 21 has been illustrated, that a number of processing systems 21 may exist within environment 10. For example, in the banking and finance industry, a number of banks exist that each receive checks from any check writing entities such as individuals, corporations, payroll management companies such as PayChex®, etc. In this industry, each receiving bank may represent a processing system 21.

Each processing system 21 may include an imager 50, including an image processor 52, a back-end access module 54, at least one (and usually a variety of) processing applications 56, and any now known or later developed other system component(s) 58 for processing used documents. Imager 50 is configured to receive a used document 40 and create an image thereof by scanning used document 40. The image, parts thereof or processed portion(s) of the image are referred to herein as "image data" 42. Image data 42 may be stored in back-end memory 44. Ancillary data 43 may also be saved with image data 42. In the context of processing system 21, ancillary data 43 may include any industry specific data that is useful for subsequent processing. Ancillary data 43 may include, for example, text information about the check amount, the payee, the payer, originating bank, background image on the check stock, date check cashed, picture of person cashing check, bank where cashed, or any other data required for the particular industry. As with front-end memory 32, back-end memory 44 may comprise any now known or later developed data storage system and/or transmission media, including magnetic media, optical media, random access memory (RAM), read only memory (ROM), a data object, etc., and may reside at a single physical location comprising one or more types of data storage, or be distributed across a plurality of physical systems. It should be recognized that if image data 42 is available without the need for an imager 50, then imager 50 may be omitted.

Image processor 52 is capable of conducting any image data-related processing of the image such as optical character recognition (OCR), rotation correction, image aliasing correction, error correction, image size scaling, thresholding to convert to a binary image, converting binary image to a smaller grayscale image, color space conversion, magnetic ink character recognition (MICR), etc. This information may then be stored as image data 42. Back-end access module 54 is configured to allow access by processing system 21 to print data 28 generated by generating system 20. Access module 54 includes any hardware and/or software configured to access print data 28 in front-end memory 32. Back-end access module 54 may include, for example, security login package for generating system 20 and/or front-end memory 32, encryption key supplier so data is transmitted securely, sending third party destination information if the front-end and back-end processing is to be handled elsewhere, etc.

Processing applications 37, 56 provide any of a variety of industry-specific document processing or analysis tools, as will be described in more detail below. In accordance with the invention, however, processing system 21, via processing applications 56, can process using print data 28 and image data 42. The advantages of this functionality will become evident relative to the description of operation and example uses, discussed further below.

With regard to front-end memory 32 and back-end memory 44, it should be recognized memory 32 can be located at generating system 20 location(s) and accessed when needed by back-end access module 54 of a processing system 21. Similarly, memory 44 can be located at processing system 21 location(s) and accessed when needed by front-end access module 34 of a generating system 20. Alternatively, a packet of print data 28 may be communicated to a processing system 21 for comparison to image data 42 stored in back-end memory 44. Similarly, a packet of image data 42 may be communicated to a generating system 20 for comparison to print data 28 stored in front-end memory 32. In another example, a third party(ies) may be implemented to collect data from any number of generating system(s) 20 and/or processing system(s) 21 and control accessibility to the data. For example, document generation could occur at a number of generating systems 20, e.g., in facsimile machines, at multiple vendor printers, or at multiple local printers. This front-end data could be collected into a single source by a third party, and thereby made easily accessible to processing system(s) 21. A document may include embedded therein information about where to find the original printed document's electronic version. Collection of data may also occur in reverse relative to an environment having a number of processing systems 21 for easy access by generating system(s) 20. In any case, the "original" front-end print data 28 is made available for processing with image data 42.

Other system component(s) 58 may include, for example, a sorting mechanism.

IV. OPERATION

Figure 2:
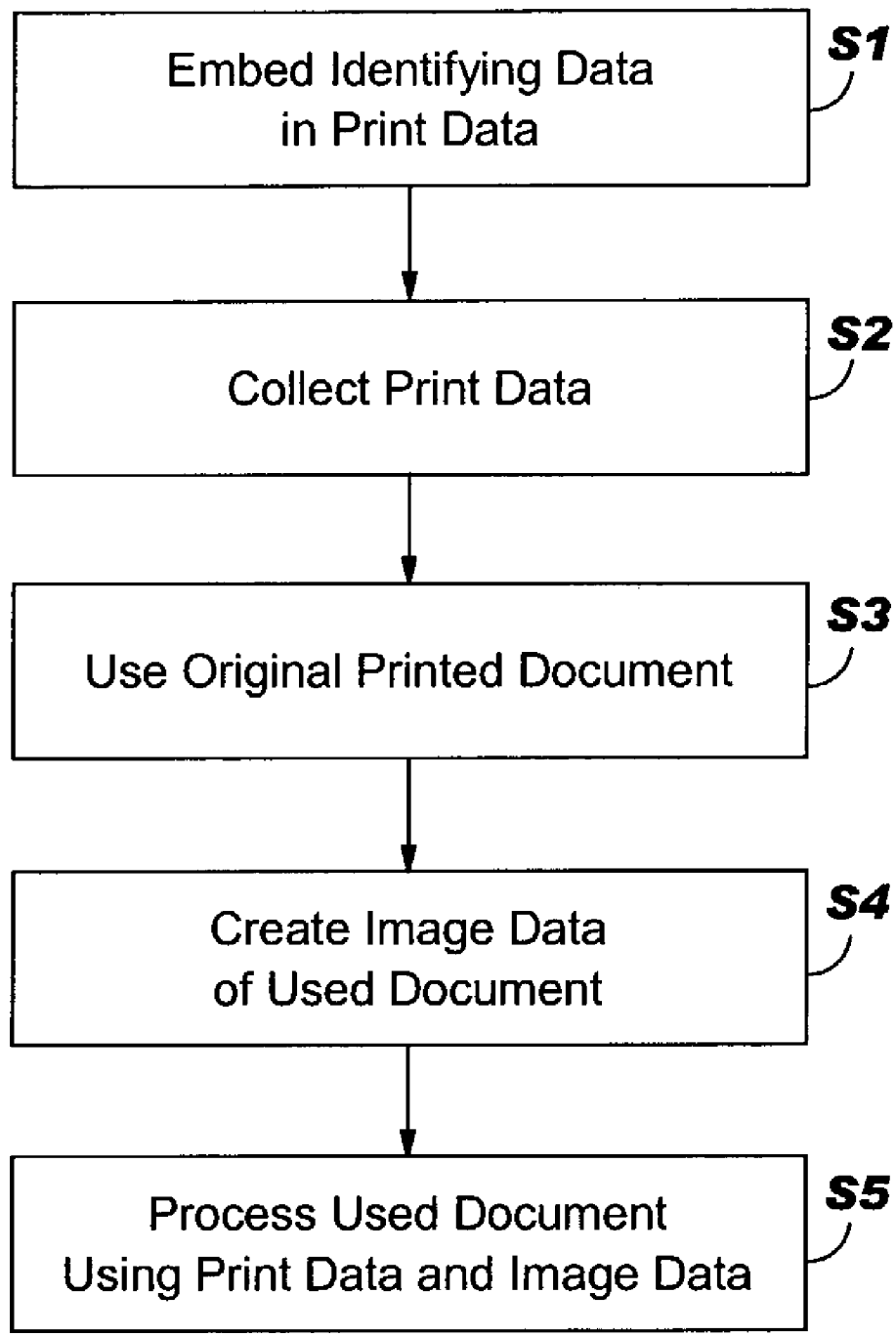
FIG. 2 shows a flow diagram of document process management according to the invention.

Referring to FIGS. 1 and 2 in combination, document processing management according to the invention will now be described. Step S1 represents an optional step in which document identifying data is embedded in print data 28 by identification data inserter 36. For example, a payee's identification in the form of a photograph could be embedded in a check for confirmation when the payee goes to cash the check. In another example, a payroll management company's identification may be embedded in print data 28 such that a processing system 21 knows which of a number of print data memories 32 to access using back-end access module 54.

In step S2, data collector 30 collects print data 28. Step S2 may also include storing print data 28 with ancillary data 29 regarding the document.

In step S3, original document 22 is used for its intended purpose. In terms of a check, the check would be sent to the payee and taken to his/her bank for cashing. In step S4, used document 40 is imaged by imager 50 to create image data 42. In terms of a check, the receiving bank would image the check to create image data 42 thereof. The imaging step may include storing image data 42 with ancillary data 43 regarding the document. The imaging step may also include conducting image processing such as optical character recognition using image processor 52.

In step S5, used document 40 is processed by one or more processing applications 37, 56 using print data 28 and image data 42. Step S5 may also include retrieving at least one of print data 28 and image data 42 from at least one data storage, i.e., memory 32 and/or memory 44. One example processing application 37, 56 includes identifying print data 28 for a used document 40 based on image data 42 for the used document. Another example processing application 37, 56 includes comparing image data 42 of used document 40 with corresponding print data 28 to detect changes to the document. Other processing applications 37, 56 will be described below.

V. EXAMPLE USES

Processing Applications

A number of example uses, by industry, and related example processing applications 37, 56 that illustrate the advantages of the invention's use of front-end print data 28 and back-end image data 42 together will now be described. It should be recognized, however, that the invention finds applicability beyond the particular examples, processing applications and industries discussed herein. Accordingly, the invention should not be limited to any one of the examples, processing applications and/or industries described below. In addition, it should be recognized that processing applications 37, 56 may be implemented at either processing system 21 and/or generating system 20.

A. Banking and Finance Industry

Continuing with the check example, checks undergo two very separate processes: generation of the checks and a separate process for the clearing of the checks by financial institutions such as banks. The above-described invention allows for closing the workflow cycle between checks that are printed, and those that are cleared. In particular, a number of processing applications 37, 56 (FIG. 1) can be implemented that take advantage of the invention's use of front-end print data 28 and back-end image data 42. During check generation, document generation data 24 is transformed into print data 28 within printing system 26. The checks are often under sophisticated control, including tracking by unique check number, allowing up-stream software, such as IBM's Infoprint Workflow and Infoprint Manager, to track and assure that all necessary checks are printed with appropriate reprints and no duplicates. During check clearing, equally sophisticated processes read the check's image data 42, verify key check information, and sort checks appropriately, including those needing manual intervention. Check image data 42 can be archived such that an "as cleared" image can be retained long term.

This invention closes these two process loops by allowing access to, and processing with, front-end print data 28 and back-end image data 42. Processing applications 37, 56 may provide the following functions and related advantages, for example:

1. Comparing for Matching Data: A comparator may be provided for comparing image data 42 with print data 28 for purposes of matching corresponding data. For example, a check image, as presented to the bank, can have OCR conducted thereon to determine, for example, the issuing bank (check generating system) identification and check number. This information provides a check-specific key that can be used to identify an appropriate front-end memory 32 and examine print data 28 for a match. In some cases, checks may not be in print data 28. For example, personal checks written by individuals would not be in print data 28 prior to presentation at the receiving bank, in which case the check and corresponding image data 42 would be handled in a conventional manner. In contrast, if a match exists for the check's image data, then the corresponding print data 28—both text data and original check images—may be used by other processing applications 37, 56 for such functions as check validation and clearance processing, described below. This processing application alone allows for the consolidation of large volume check printing, sorting and repository services.

2. Validating and Automatic Fraud/Forgery Detecting: A comparator may be provided for comparing of print data 28 and image data 42 to allow processing applications 37, 56 to conduct a variety of fraud, forgery and/or alteration detecting processes. In terms of fraud or alteration, if, for instance, the amount of the imaged check does not match the amount of the check as printed, then the check can be diverted for investigation instead of cleared. A non-match may indicate fraud, forgery or a mis-read by OCR/image processor 52. In addition, if the print data 28 is binary, it can be converted to the correct-sized image with multiple levels at processing system 21. For example, if the check were printed on paper stock that had the background pre-printed, then only a binary image at 600 pels per inch may have been printed on the paper containing personalized and formatted information such as the check number, name and address of the payer, the originating bank, the payee name and address, check amount as numbers, the check amount spelled out, and the signature line. Image data 42 may be a lower resolution grayscale image, e.g., 100 pixels per inch. A grayscale approximation of the original binary 600 pels per inch image can be created by summing the number of black pels in each 6×6 pel square, and adjusting the dynamic range to match the scanned image. When superimposed on the scanned image data 42 in a different color, any significant difference appears as an obvious color difference. Accordingly, alteration of the check becomes easy to discern. With specific regard to check number alteration, since print data 28 includes only those numbers that have actually been printed and the exact data on each check, it is harder for criminals to generate a legitimate appearing but fraudulent check.

In terms of duplicate checks, processing applications 37, 56 would be able to detect a duplicate check being presented, produce the check's print data 28 and image data 42 as cleared the first time, and any other presented checks that match the check number. This would allow comparison of the signatures, and any other marks on the check images.

In terms of forgery, the time between mailing of printed checks and depositing of a check could be used to find and store the intended recipient's signature with the front-end print data 28, i.e., as ancillary data 29. Image data 42 could then be compared over several months to detect a significant change in the signature.

Overall, automatic fraud/forgery/alteration detection eliminates the need to have manual intervention on documents. Further, processing system 21 could become faster since only one OCR attempt rather than, for example, five attempts can be made because errors are exposed through comparison with print data 28. In addition, if access to processing applications 37, 56 were fast enough, a problem(s) could be made known to the bank/receiver while the cashier was still at the bank. In any case, print data 28 along with image data 42 may be forwarded to police as evidence of a crime.

With regard to 1. and 2. above, it should be recognized that it may be advantageous to have tasks completed at different locations. For example, when a match is not detected, processing system 21 may return image data 42 to generating system 20 (or a third party holder of front-end memory 32) for inquiry into a legitimate reason for the mis-match.

3. Confirming Check Clearance: The check tracking number and amount of the check, as scanned via OCR (image data 42), can now be confirmed by verifying against print data 28 of the original check.

4. Allowing Long-term repository of Printed and Cleared Checks: Checks can now be matched with their original print data 28, so that both the images of the check as-printed and as-cleared can be available in a long-term archive.

5. Providing Additional Services such as Status Query: Additional services can be offered because generating system 20 can be notified that a processing system 21 has received a check. In one example, check issuers can place status queries to see exactly which of their checks have cleared, access the confirmed amounts of the checks, and check images as printed and as cleared. Such queries could be useful for customer follow-up, managing accounts receivable and obligations, and for confirming the amounts of the checks that are cleared. In another example, banking clients may now be provided with more current information on cash flow, inventory, etc. Other additional services are also possible.

6. Automatic Check Reprinting: When checks are not presented to a bank (usually within 60 days from the date of issue), they may need to be reprinted. Because generating system 20 stores print data 28 of the original check, a reprint of that check is possible at a later time. In this case, either printing system 26 or identification data inserter 36 may include a reprint marker, e.g., "reprint #1", as a grayscale image at some place on the check. This would allow the reprinted check to be distinguished from the original. Note that reprinting could be done automatically after 60 days (or any time period), so that no time would be wasted re-keying the customer account information, check amount, etc. Also note that processing applications 37, 56 could automatically register the original check image as "void," so that it would not clear if the original check were presented beyond the validity date. Processing applications 37, 56 could then group the entire "family" of checks, e.g., printed original, reprinted version(s) and any presented checks, together in back-end memory 44.

7. Allowing Data Storage Size Reduction and Indexing Simplification: In cases where the back-end image data 42 matches the "perfect" front-end print data 28, less information about the check may need to be stored. For example, the front-end print data 28 may be considered the "original" check where, normally, image data 42 would be considered the original. In this case, less new information such as the date and time of receipt of the check may be necessary since all other pertinent information is redundant and already known. Further, since print data 28 of checks may have been generated in a particular useful order (e.g., by check number, by company, by invoice number or by date), indexing of checks may be easier to automate.

8. Providing Data Quality Advantages: Print data 28 may be generated in a standard image format and therefore can be used, e.g., for viewing, without knowledge of the generating technique, printer, company, program or memory used to generate it. In addition, since print data 28 is noiseless, it compresses better than scan-generated image data 42 and may have superior image quality. In addition, text data could be extracted perfectly from image data 42 because the OCR results can be compared to the text-data already available in print data 28, thus allowing the OCR process to be tested, tuned, and refined off-line.

9. Providing Procedural Quality Assurance: Documents such as Welfare and Social Security checks are supposed to be printed on a regular schedule such as monthly. In order to track procedural compliance, front-end memory 32 could flag checks that were not printed on time.
10. Improving Accounting: Printed data 28 of checks can be forwarded to an accounting department so that check information such as account number, amount, payer, etc., can be entered into requisite accounting and taxation systems before a check clears. When a check clears, a clearance notice can be sent from processing system 21 with only clearance related data therein, e.g., a clearance date. In this way, an accounting department does not have to wait for check clearance in order to update accounting records, which makes record keeping faster, and may increase cash flow.

B. Standardized Testing Industry

Relative to the standardized testing industry, processing applications 37, 56 may provide the following functions and related advantages, for example:

1. Special Formatting: Test booklets are often printed in sections and assembled such that each test in a group has uniquely ordered questions. After use in which the tests are filled out, the test booklets are split apart into sections again, scanned with an identifying cover sheet, and individually sent to scorers. Once scored, the results for each test booklet must be re-compiled for each test taker. Processing using print data 28 and image data 42 allows special formatting of information on a booklet-by-booklet basis that assists this process. For example, print-on-demand technology may allow test booklets to be printed with individual test taker identification and test page/question order identification. The identifications may include, for example, a bar code. In this case, re-compiling is simplified because print data 28 can provide the indexing information for use with image data 42. Accordingly, test booklets no longer need to be batch scanned with some independent identifying cover sheets since each test booklet contains the information that allows retrieval of print data 28.
2. Archiving of Test Booklets: Paper test booklets are archived in warehouses for various amounts of time in case scoring is questioned. Finding a particular used test booklet in the warehouse is time consuming and labor intensive. Use of image data 42 and print data 28 ease this burden by storing electronic versions of the original test and the scanned used test. Accordingly, instead of finding the paper, the electronic version(s) can be retrieved, e.g., via automated searching.
3. Automatic Scoring Advantages: Where multiple choice bubbles are used, the returned test booklets could be automatically scored if only one answer is marked per question based on print data 28 knowing the correct answers. The scanned image can be compared to the original print data. The user has filled in (hopefully) only one bubble per question. The location of the filled-in bubble can be determined by processing application 56 and compared to the correct answer supplied in the ancillary data 29 received with the print data 28. If more than one bubble has been darkened, then the darkest one (assuming the others were intended to be erased) could be compared to the right answer. Wrong answers with multiple bubbles filled in for a given question may need to be diverted for a human to judge before being scored. The automatic scoring would allow faster feedback to test takers. If more than one answer is marked, print data 28 and image data 42 of the test booklet, as well as an image of the correct answers, could be presented to a human for comparison. If correct answers are presented as larger colored bubbles in the correct answer image, the correct answers appear as a color outlining a dark bubble. In contrast, missing right answers appear as a solid colored bubble, and wrong answers appear as dark bubbles without the colored edge. Alternately, the wrong answers could be given a different colored bubble. Then, if more than one answer is right, any mark with a correct color is accepted.

Based on this type processing, individualized tests from generating system 20 can be saved as printed, and answers generated on-the-fly during automatic grading. In this case, there are no answer sheets to protect. Since each test is individualized and no answer sheets have been created and printed, cheating by stealing the answer sheets is thwarted. Answers sheets would have to be generated if front-end information was not available to back-end scoring processing. Since front-end and back-end document processing are joined, keeping the answers attached to front-end data is feasible. As an added security measure, front-end data may not be released until after the testing day. Color coding of right and wrong answers is an example of ancillary data 29 stored with print data 28 and used in the back end processing. For example, midshipmen on ships take tests. Normally, the answer sheets have to be faxed to an officer so the results can be scored. With this approach, the officer could review the automatically scored test alone or with the midshipman and not need a separate piece of paper with the answers attached. This is helpful since every test can be different.

C. Insurance Industry

Relative to the insurance industry, processing applications 37, 56 may provide the following functions and related advantages, for example:

1. OCR Accuracy Checking: Correspondence that is generated by a third party can include an identifier that once scanned and processed allows access to front-end print data 28. Comparison of image data 42 to print data 28 in this case may allow checking of OCR data taken from image data 42.
2. Fraud Detection: Any fraudulent correspondence can be easily detected since it will not have corresponding data in front-end memory 32.

VI. CONCLUSION

In the previous discussion, it will be understood that the method steps discussed may be performed by a processor, such as a central processing unit of a computer system, executing instructions of program product stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of processing a document comprising:
    collecting electronic print data usable for printing the document;
    imaging the document after the document is used to create image data; and
    processing the document, by:
        retrieving the print data;
        comparing the print data to the image data;
        authenticating the document if there is a match between the print data and the image data; and
        flagging the document as being altered if there is not a match between the print data and the image data.

2. The method of claim 1, wherein the print data includes at least one of image data, pixel data and language data.

3. The method of claim 1, further comprising the step of embedding document identifying data in the print data prior to the collecting step.

4. The method of claim 1, wherein the collecting step includes storing print data with ancillary data regarding the document.

5. The method of claim 1, wherein the imaging step includes storing image data with ancillary data regarding the document.

6. The method of claim 1, wherein the processing step includes retrieving at least one of the print data and the image data from at least one data storage.

7. The method of claim 1, wherein the processing step includes identifying the print data for a document based on the image data for the document.

8. The method of claim 1, wherein the processing step includes comparing the image data of the document after use with the print data.

9. A system for document processing comprising:
    a back-end document processing system to process a document after the document is used including:
        a first access module to access electronic print data generated by a front-end document generating system that generated the print data based on document generation data;
        an imager for imaging the document after the document has been used; and
        a processing application to compare the print data to the image data, authenticate the document if there is a match between the print data and the image data and flag the document as being altered if there is not a match between the print data and the image data.

10. The system of claim 9, wherein the front-end document generating system includes: a printing system for generating print data usable for printing a document based on the document generation data; and a data collector for persistently saving the print data generated by the printing system.

11. The system of claim 9, wherein the front-end document generating system further includes a front-end access module for making the print data accessible to the back-end document processing system.

12. The system of claim 9, further comprising an image processor.

13. A computer program product comprising a computer readable medium having computer readable program code embodied therein for processing a document, the program product comprising:
    program code to generate image data from imaging of the document after the document is used;
    program code to access electronic print data generated by a front-end document generating system that generates print data usable for printing the document based on document generation data; and
    program code to process the document by:
        retrieving the print data;
        comparing the print data to the image data; and
        authenticating the document if there is a match between the print data and the image data; and
        flagging the document as being altered if there is not a match between the print data and the image data.

* * * * *